United States Patent
Kakeno (10) Patent No.: US 9,549,086 B2
(45) Date of Patent: Jan. 17, 2017

(54) IMAGE FORMING APPARATUS

(71) Applicant: KYOCERA Document Solutions Inc., Osaka-shi, Osaka (JP)

(72) Inventor: Wataru Kakeno, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/995,531

(22) Filed: Jan. 14, 2016

(65) Prior Publication Data
US 2016/0212281 A1 Jul. 21, 2016

(30) Foreign Application Priority Data
Jan. 16, 2015 (JP) ................. 2015-006349

(51) Int. Cl.
 G06F 15/00 (2006.01)
 H04N 1/00 (2006.01)
 H04N 1/32 (2006.01)
(52) U.S. Cl.
 CPC .......... *H04N 1/00204* (2013.01); *H04N 1/32* (2013.01); *H04N 1/32277* (2013.01); *H04N 1/32358* (2013.01); *H04N 2201/0094* (2013.01)

(58) Field of Classification Search
 USPC .............................. 358/1.13–1.15
 See application file for complete search history.

(56) References Cited

U.S. PATENT DOCUMENTS

2011/0158549 A1* 6/2011 Tanaka ................. G06F 3/1211
 382/232

FOREIGN PATENT DOCUMENTS

| JP | 2004094440 A | 3/2004 |
| JP | 2004094443 A | 3/2004 |
| JP | 2006174331 A | 6/2006 |

\* cited by examiner

*Primary Examiner* — Saeid Ebrahimi Dehkord
(74) *Attorney, Agent, or Firm* — Alleman Hall McCoy Russell & Tuttle LLP (57) ABSTRACT

In an image forming apparatus, a compression history recording portion stores compression history information in a non-transitory computer-readable information storage medium, wherein the compression history information represents results of accumulation of compression levels through the compression process executed by the data compression portion. A history monitoring portion executes a predetermined improvement process when the compression history information satisfies a predetermined insufficient compression condition.

7 Claims, 4 Drawing Sheets

| SUPPLIER | TYPE | COMPRESSION LEVEL FREQUENCY | | |
|---|---|---|---|---|
| | | L | M | H |
| aaa | pdf | 1 | 32 | 1 |
| bbb | jpg | 0 | 10 | 3 |
| aaa | jpg | 0 | 15 | 2 |

| SUPPLIER | TYPE | COMPRESSION CONDITION |
|---|---|---|
| ccc | jpg | xxx |
| ddd | bmp | yyy |

D8

D21,D2   D22,D2   D80

FIG.5

IMAGE FORMING APPARATUS

INCORPORATION BY REFERENCE

This application is based upon and claims the benefit of priority from the corresponding Japanese Patent Application No. 2015-006349 filed on Jan. 16, 2015, the entire contents of which are incorporated herein by reference.

BACKGROUND

The present disclosure relates to an image forming apparatus having a function to compress raster image data.

In general, it is known that an image forming apparatus includes a data conversion portion and a data compression portion. The data conversion portion converts job data for image formation obtained from another apparatus such as a user terminal, to raster image data. The data compression portion compresses the raster image data.

The image forming apparatus executes an expansion process to expand compressed data stored in a temporary storage area assigned in a data buffer, and executes an image forming process based on the expanded data.

In addition, it is known that when a compression result exceeding a predetermined compression rate is obtained by executing a compression process on the raster image data, the compression process is re-executed after changing a compression parameter so that the compressed data is more reduced in size than with the initial compression process.

SUMMARY

An image forming apparatus according to an aspect of the present disclosure includes a data conversion portion, a data compression portion, a compression history recording portion, and a history monitoring portion. The data conversion portion converts job data for image formation to raster image data. The data compression portion executes a compression process for compressing the raster image data under a predetermined reference compression condition. Furthermore, when a compression level of the compression process does not satisfy a predetermined allowable compression condition, the data compression portion re-executes the compression process under a modified compression condition modified from the reference compression condition. The compression history recording portion stores compression history information in a non-transitory computer-readable information storage medium, wherein the compression history information represents results of accumulation of compression levels through the compression process executed by the data compression portion. The history monitoring portion executes a predetermined improvement process when the compression history information satisfies a predetermined insufficient compression condition.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the disclosure.

[Image Forming System]

First, the configuration of an image forming system 100 including an image forming apparatus 10 according to an embodiment of the present disclosure is described with reference to FIGS. 1 and 2. The image forming system 100 causes the image forming apparatus 10 to form an image based on job data D1 for image formation transmitted from a terminal 9 of a user.

Figure 1:
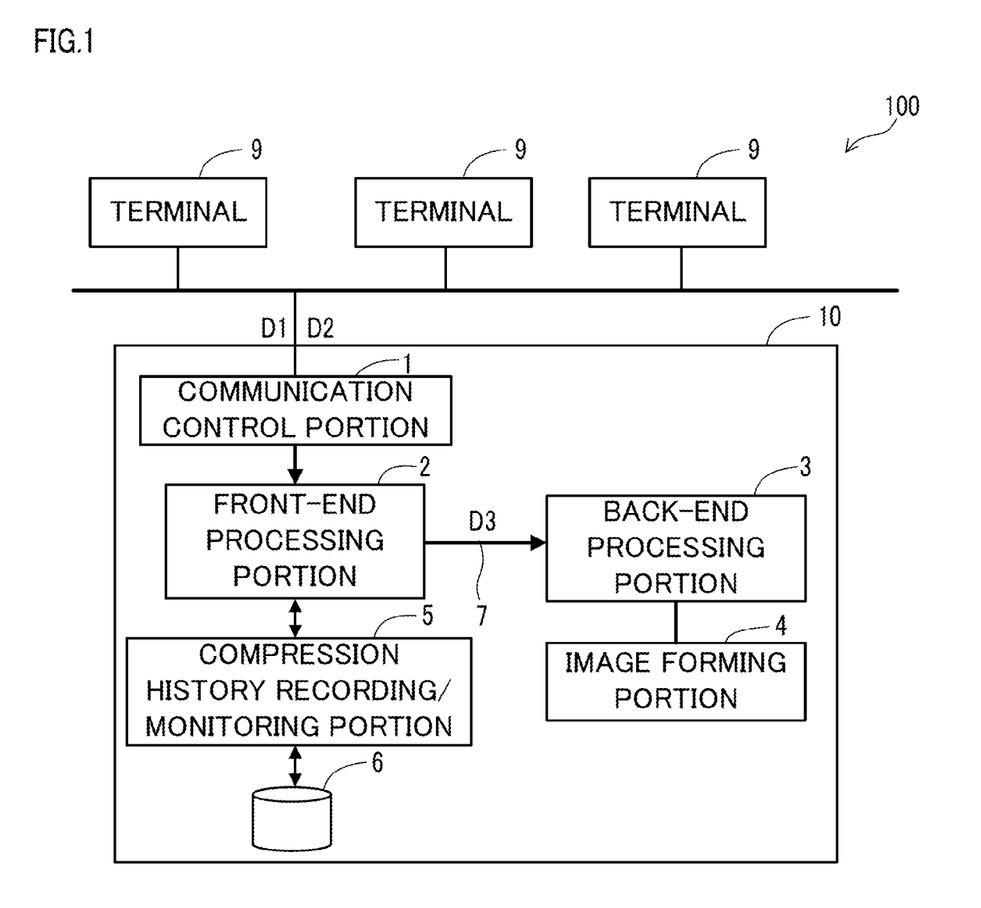
FIG. 1 is a block diagram of an image forming system that includes an image forming apparatus according to an embodiment of the present disclosure.

As shown in FIG. 1, the image forming system 100 includes the image forming apparatus 10 and one or more terminals 9. The image forming apparatus 10 and the terminals 9 are communicably connected by a network 90. The network 90 may be a wired network or a wireless network.

The terminal 9 is an information processing apparatus including a processor, an operation portion, and a display portion, wherein the processor performs data processing, the operation portion is, for example, a keyboard or a touch panel, and the display portion is, for example, a liquid crystal panel. As one example, the terminal 9 may be a personal computer or a mobile terminal such as a smartphone.

The job data D1 that is transmitted from the terminal 9 to the image forming apparatus 10 is, for example, data written in a page description language (PDL). The job data D1 has been converted from any of a variety of types of application data such as document data and chart data.

[Outlined Configuration of Image Forming Apparatus]

The image forming apparatus 10 forms an image corresponding to the job data D1 on a recording sheet. The recording sheet is a sheet-like image formation medium such as a sheet of paper or a film.

The image forming apparatus 10 may be an electrophotographic printer or an inkjet printer. In addition, the image forming apparatus 10 may be a multifunction peripheral having a function of an image reading device for reading an image from a document sheet, and a function of an image forming device for forming an image on a recording sheet. Furthermore, the image forming apparatus 10 may be a facsimile apparatus having the function of the image reading device and an image transmission function.

As shown in FIG. 1, the image forming apparatus 10 includes a communication control portion 1, a front-end processing portion 2, a back-end processing portion 3, and an image forming portion 4.

The communication control portion 1 is a communication interface that performs a communication with the terminal 9 via the network 90. The communication control portion 1 receives the job data D1 for image formation from the terminal 9, and passes the job data D1 to the front-end processing portion 2.

Furthermore, the communication control portion 1 receives job attribute data D2 from the terminal 9 together with the job data D1. The job attribute data D2 includes, for example, supplier identification data D21 and type identification data D22. It is noted that the job attribute data D2 is an example of the job attribute information, and the supplier identification data D21 and the type identification data D22 are examples of two types of information that respectively identify the supplier and the type of the job data D1.

The supplier identification data D21 identifies the supplier of the job data D1. The supplier identification data D21 identifies, for example, the user of the terminal 9 who transmitted the job data D1, or identifies the terminal 9 itself. In the former case, the supplier identification data D21 may be a user ID that is input to the terminal 9 in the log-in process. In the latter case, the supplier identification data D21 may be a MAC address or an IP address of the terminal 9.

The type identification data D22 identifies the type (such as JPEG or PDF) of the job data D1.

The front-end processing portion 2 may be a circuit that converts the job data D1 to raster image data D30 and further executes a compression process on the raster image data D30, or may be an element on which the circuit is formed. In the compression process, the raster image data D30 is compressed into compressed data D3, and the compressed data D3 is transported from the front-end processing portion 2 to the back-end processing portion 3 via a data transportation medium 7 such as a bus.

The front-end processing portion 2 includes a job data buffer 21, a data conversion portion 22, a data compression portion 23, and a data transportation portion 24. The job data buffer 21 temporarily stores the job data D1 and the job attribute data D2 that are obtained via the communication control portion 1.

The data conversion portion 22 is a data processing portion that converts the job data D1 in the job data buffer 21 to the raster image data D30. The data conversion portion 22 interprets the PDL of the job data D1, and sequentially generates raster image data D30 for each predetermined output unit in correspondence with the interpretation result of the PDL. The output unit is, for example, each piece of data corresponding to each page of the recording sheet. Hereinafter, the process for converting the job data D1 to the raster image data D30 is referred to as a rasterization process.

The data compression portion 23 is a data processing portion that executes the compression process on the raster image data D30 of each output unit output from the data conversion portion 22. The data transportation portion 24 transports the compressed data D3 to the back-end processing portion 3 via the data transportation medium 7. It is noted that the compression process may be a well-known process such as JPEG codec process or WebP codec process.

The job data D1 input to the image forming apparatus 10 may be a kind of data that shows the effect of the compression well, or a kind of data that does not show the effect much. The latter kind of data has a greater compression rate than the former kind of data when they are subjected to the compression process under the same compression condition.

The back-end processing portion 3 may be a circuit that controls the image forming portion 4 while executing an expansion process and other image processing on the compressed data D3, or may be equipment including the circuit.

The back-end processing portion 3 includes a data receiving portion 31, an image data buffer 32, a data expanding portion 33, an image processing portion 34, and an image formation control portion 35. In the present embodiment, the back-end processing portion 3 further includes a display portion 36 and a MMI (Man Machine Interface) control portion 37.

The data receiving portion 31 obtains the compressed data D3 from the data transportation portion 24 via the data transportation medium 7, and stores the compressed data D3 in a temporary storage area 320 of the image data buffer 32.

The image data buffer 32 is, for example, a dynamic random access memory for temporarily storing the compressed data D3. The temporary storage area 320 of the image data buffer 32 is allocated, at any time, a space sufficient to store the compressed data D3 converted from the raster image data D30 of each output unit with a predetermined upper-limit compression rate.

It is noted here that the compression rate is an example of an index that represents the compression level of the compression process. The compression rate is a ratio in size of the compressed data D3 to the raster image data D30 before compression. As a result, in the compression process, the greater the compression rate is, the smaller the compression level is, namely, the larger the size of the compressed data D3 is.

The data expanding portion 33 is a data processing portion that executes the expansion process on the compressed data D3 stored in the temporary storage area 320 of the image data buffer 32. After an expansion process is executed, the compressed data D3 on which the expansion process was executed is deleted from the image data buffer 32.

The image processing portion 34 is a data processing portion that generates output image data D4 by executing various types of image processing on raster image data D30 output from the data expanding portion 33, wherein the output image data D4 is used in the image formation.

The image formation control portion 35 controls the image forming portion 4. The image formation control portion 35 obtains the output image data D4 from the image processing portion 34, and causes the image forming portion 4 to form an image on a recording sheet based on the output image data D4.

The display portion 36 is a panel-like information display device such as a crystal liquid panel. The MMI control portion 37 is a data processing portion that controls the display portion 36 and the operation portion (not shown).

The image forming portion 4 forms an image on a recording sheet by a well-known image forming process. The image forming portion 4 of electrophotography includes an image carrying member (not shown) and peripheral devices around it, and transfers an image of developer from the image carrying member to the recording sheet and fixes the image to the recording sheet.

In the image forming apparatus 10, the rasterization process is executed before a timing when the raster image data D30 is required for the image forming process. This allows the performance of the image formation process to be exhibited to the maximum in the image forming apparatus 10.

In the case where the rasterization process is performed before the image forming process, the image data buffer 32 for temporarily storing the raster image data D30 that has a large size is required. The data compression portion 23 is provided for the purpose of reducing the required capacity of the image data buffer 32. In addition, the data compression portion 23 also plays a role of reducing the load of the devices, such as the data transportation medium 7 and the data transportation portion 24, that are required to transport the raster image data D30.

When the data compression portion 23 compresses the raster image data D30 with a compression rate that is equal to or less than the upper-limit compression rate, the data expanding portion 33 and the image processing portion 34 can supply the output image data D4 of each output unit in synchronization with the processing of the image formation control portion 35.

However, when the compression rate of the compression process of each output unit exceeds the upper-limit compression rate, the data expanding portion 33 and the image processing portion 34 may fail to supply the output image data D4 in time for the process of the image formation control portion 35.

As a result, the data compression portion 23 re-executes the compression process when the compression rate of the compression process of each output unit exceeds the upper-limit compression rate. In this case, the compressed data D3 that was generated with the compression rate exceeding the upper-limit compression rate is discarded, and compressed data D3 that is generated in the re-executed compression process is stored in the image data buffer 32. That the compression rate of each output unit exceeds the upper-limit compression rate is an example of the case where the compression level does not satisfy the predetermined allowable compression condition.

At first, the data compression portion 23 executes the compression process of each output unit under a predetermined reference compression condition. Subsequently, when the compression rate in the compression process under the reference compression condition exceeds the upper-limit compression rate, the data compression portion 23 re-executes the compression process under a modified compression condition modified from the reference compression condition. The reference compression condition is modified to the modified compression condition so that the compressed data D3 generated under the modified compression condition is smaller in size than the compressed data D3 generated under the reference compression condition.

For example, when the compression process is an irreversible compression process, the reference compression condition may be modified to the modified compression condition so that an encode quality parameter of the modified compression condition specifies a lower level of image quality after the compression than the reference compression condition.

As described above, the data compression portion 23 re-executes the compression process under the modified compression condition that has been modified from the reference compression condition, when the compression level of the compression process performed under the reference compression condition does not satisfy the predetermined allowable compression condition.

The allowable compression condition in the present embodiment is that the compression rate falls within the upper-limit compression rate. In addition, the allowable compression condition may be that the size of the compressed data D3 falls within a predetermined upper-limit size.

The data compression portion 23 may determine whether or not the allowable compression condition is satisfied at the end of the compression process performed on the raster image data D30 of each output unit.

In addition, the data compression portion 23 may determine, in the middle of the compression process of each output unit, whether or not the allowable compression condition is satisfied. In this case, when the compression process of each output unit has reached to a predetermined progress level, the data compression portion 23 determines that the allowable compression condition is satisfied if the compression rate or the size of the compressed data D3 at the progress level has not exceeded a predetermined allowable value which is set for the progress level.

The data conversion portion 22, the data compression portion 23, the data expanding portion 33, the image processing portion 34, and the image formation control portion 35 are each realized by, for example, an ASIC (Application Specific Integrated Circuit) or a DSP (Digital Signal Processor).

It is noted that the image forming apparatus 10 further includes a compression history recording/monitoring portion 5 and a history data storage portion 6 that are described in detail below.

Meanwhile, with regard to the situation where the job data D1 is input to the image forming apparatus 10, there are various situations such as a situation where a lot of pieces of job data D1 that do not show the effect of the compression much are input to the image forming apparatus 10, and a situation where a lot of pieces of job data D1 that show the effect of the compression well are input to the image forming apparatus 10. In the case of the former situation, the compression process is frequently re-executed by the data compression portion 23, and the speed of the image forming process may be remarkably lowered. In the case of the latter situation, changing the reference compression condition in a direction where the compression level is reduced may restrict an image quality degradation caused by the compression process, and thereby form a high-quality image.

As a result, it is desired that some measure is taken so that the performance of the apparatus is exhibited to the maximum, based on the tendency of the characteristics of a plurality of pieces of job data D1 input to the image forming apparatus 10. In addition, when the ability of the image forming apparatus 10 is not sufficient to deal with some kinds of job data D1 that are frequently input, it is desired that some measure, such as proposing an exchange or an additional installment of a component, is taken.

With the compression history recording/monitoring portion 5, the image forming apparatus 10 can take some measure so that the performance of the apparatus is exhibited to the maximum, based on the tendency of the input job data D1 for image formation.

[Compression History Recording/Monitoring Portion]

Figure 2:
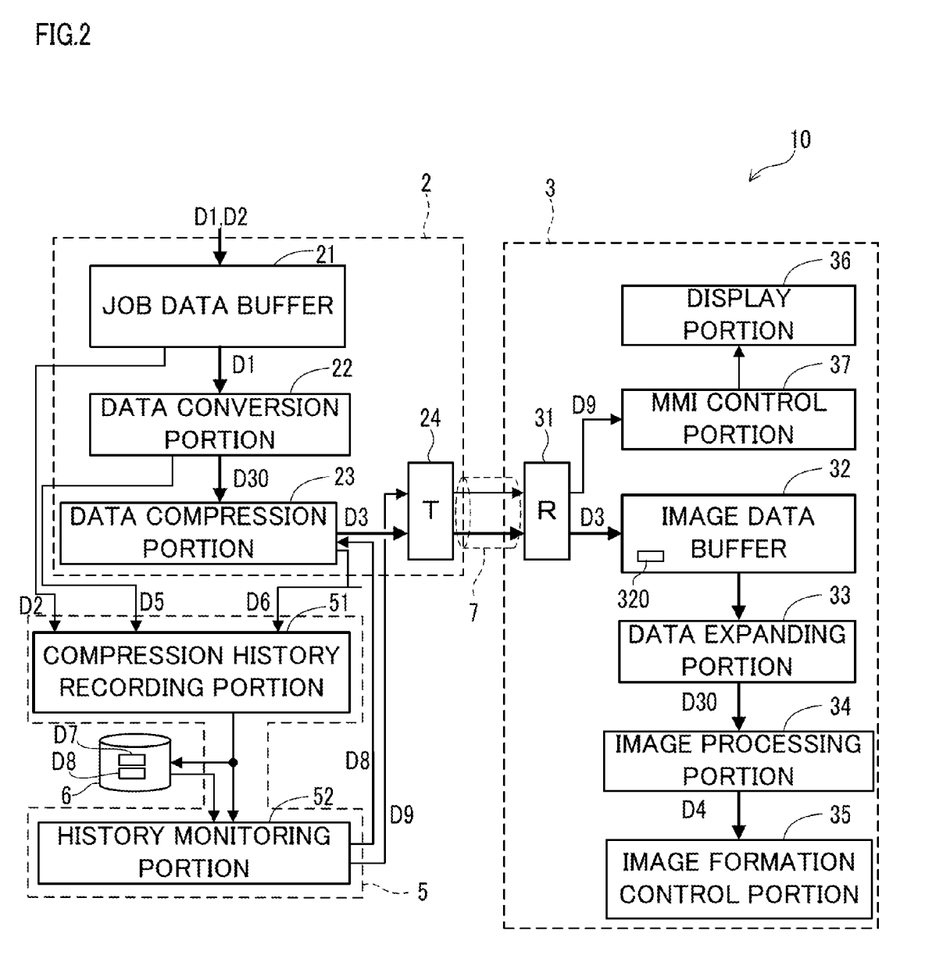
FIG. 2 is a block diagram of a portion related to a compression history recording/monitoring portion in the image forming apparatus according to an embodiment of the present disclosure.

As shown in FIG. 2, the compression history recording/monitoring portion 5 includes a compression history recording portion 51 and a history monitoring portion 52. The compression history recording/monitoring portion 5 is realized by, for example, an ASIC or a DSP. In addition, the history data storage portion 6 is a nonvolatile computer-readable information storage medium such as a hard disk drive or a flash memory.

The compression history recording portion 51 executes a compression history recording process for storing compression history data D7 in the history data storage portion 6. The compression history data D7 is an example of the compression history information representing results of accumulation of compression levels through the compression process executed by the data compression portion 23.

Figure 3:
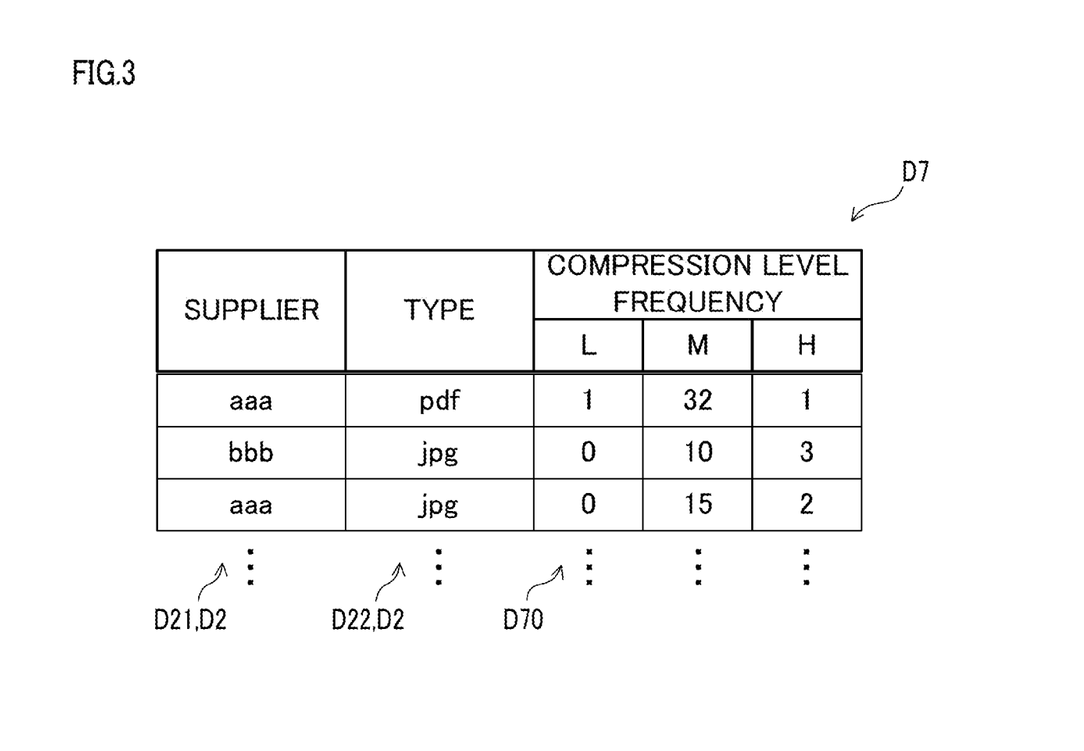
FIG. 3 shows an example of the configuration of compression history data generated by the image forming apparatus according to an embodiment of the present disclosure.

FIG. 3 shows an example of the configuration of the compression history data D7. In the example shown in FIG. 3, the compression history data D7 is composed of the job attribute data D2 and compression level frequency data D70 that are correlated with each other. The compression level frequency data D70 is an example of the information representing results of accumulation of compression levels through the compression process.

In the example shown in FIG. 3, the job attribute data D2 is composed of supply source identification data D21 and type identification data D22. Furthermore, in the example shown in FIG. 3, each piece of compression level frequency data D70 corresponds to a different combination of a piece of supply source identification data D21 and a piece of type identification data D22.

The compression level frequency data D70 represents a frequency distribution of compression levels in the compression process of each output unit under the reference compression condition. More specifically, it is determined which of a plurality of classes a result value of the compression rate of each output unit belongs to, and a generation frequency for each class is recorded as the compression level frequency data D70, wherein the plurality of classes respectively represent compression levels and are set based on the upper-limit compression rate.

In the example shown in FIG. 3, "L", "M" and "H" represent the classes of compression level. The class H means that the result value of the compression rate is above the upper-limit compression rate. The class M means that the result value of the compression rate is in a range between the upper-limit compression rate and a predetermined lower-limit compression rate. The class L means that the result value of the compression rate falls below the lower-limit compression rate. It is noted that instead of three, four or two classes of compression level may be set.

Each time the compression process of each output unit is executed under the reference compression condition, a class of compression level to which the result value of the compression rate of the compression process belongs is counted up by one. Furthermore, in a predetermined cycle, all the classes of compression level in the compression level frequency data D70 are counted down by one, with zero being the lower-limit value. With this configuration, the compression level frequency data D70 represents generation frequencies of the compression levels in the predetermined cycle.

The compression history recording portion 51 obtains pre-compression size data D5 from the data conversion portion 22, and obtains post-compression size data D6 from the data compression portion 23. The pre-compression size data D5 represents the size of the raster image data D30 of each output unit. The post-compression size data D6 represents the size of the compressed data D3 of each output unit.

It is noted that the compression history recording portion 51 may obtain the pre-compression size data D5 from the data compression portion 23. In addition, the compression history recording portion 51 may obtain the post-compression size data D6 from the data expanding portion 33.

The compression history recording portion 51 calculates the compression rate of each output unit based on the pre-compression size data D5 and the post-compression size data D6, and determines which of the plurality of classes the calculation result belongs to.

Furthermore, the compression history recording portion 51 counts up, by one, the class of compression level of a piece of compression level frequency data D70 that corresponds to a combination of a piece of supply source identification data D21 and a piece of type identification data D22 that corresponds to a piece of raster image data D30 on which the compression process was performed.

The compression history recording portion 51 may store the compression history data D7 in the history data storage portion 6 and pass it to the history monitoring portion 52.

When the compression history data D7 satisfies a predetermined insufficient compression condition, the history monitoring portion 52 executes a predetermined first improvement process. Furthermore, when the compression history data D7 satisfies a predetermined excess compression condition, the history monitoring portion 52 executes a predetermined second improvement process.

In the present embodiment, the history monitoring portion 52 performs the determination on the insufficient compression condition and the first improvement process for each piece of job attribute data D2. Similarly, the history monitoring portion 52 performs the determination on the excess compression condition and the second improvement process for each piece of job attribute data D2.

The insufficient compression condition is that a situation where the compression level of the compression process falls below a predetermined allowable lower limit occurs with a frequency that exceeds a predetermined threshold. In the case where the compression history data D7 shown in FIG. 3 is adopted, the insufficient compression condition is that the value of the class L in the compression level frequency data D70 exceeds a predetermined upper threshold.

In the present embodiment, the first improvement process includes a compression condition enhancement process and a proposal notification process. In the compression condition enhancement process, the reference compression condition is changed in a direction where the compression level of the compression process is improved, namely, in a direction where the compression rate is decreased.

More specifically, when the compression history data D7 satisfies the insufficient compression condition, the history monitoring portion 52 outputs compression condition setting data D8 to the data compression portion 23. The compression condition setting data D8 instructs to change the reference compression condition of the compression process.

Figure 4:
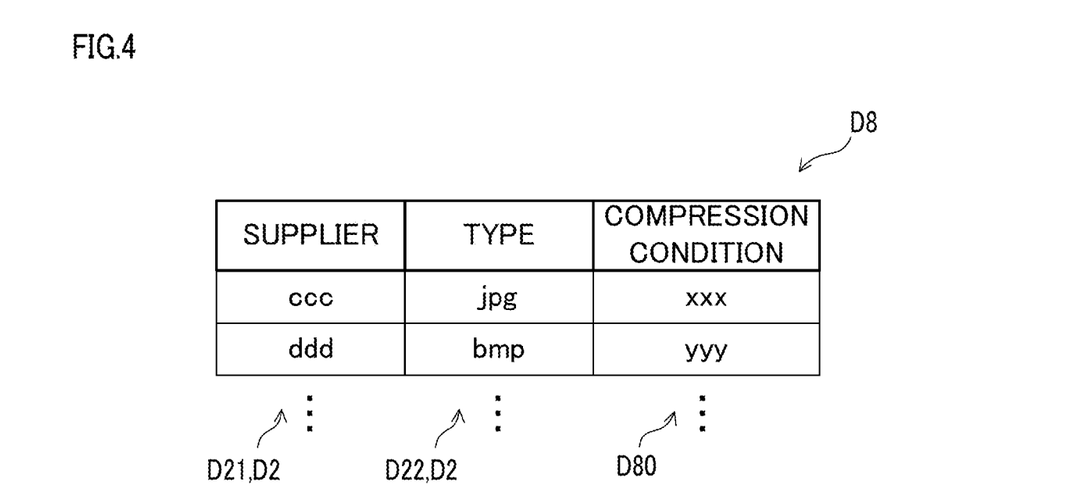
FIG. 4 shows an example of the configuration of compression condition setting data generated by the image forming apparatus according to an embodiment of the present disclosure.

FIG. 4 shows an example of the configuration of the compression condition setting data D8. In the example shown in FIG. 4, the compression condition setting data D8 is composed of the job attribute data D2 and compression condition specification data D80 that are correlated with each other. The compression condition specification data D80 may specify a difference between a current level and a changed level of the encode quality parameter, wherein the changed level is lower than the current level in image quality.

In the example shown in FIG. 4, each piece of compression condition specification data D80 corresponds to a different combination of a piece of supply source identification data D21 and a piece of type identification data D22. With respect to a piece of raster image data D30 that was converted from a piece of job data D1 that corresponds to a piece of job attribute data D2 in the compression condition setting data D8, the data compression portion 23 executes the compression process under the compression condition specified by a piece of compression condition specification data D80 that corresponds to the piece of job attribute data D2.

The history monitoring portion 52 initializes a partial data of the compression history data D7 that satisfies the insufficient compression condition. More specifically, the history monitoring portion 52 initializes, to zero, one or more classes in the compression level frequency data D70 that satisfy the insufficient compression condition.

Furthermore, the history monitoring portion 52 holds the compression condition setting data D8 and references the compression condition setting data D8 at any time. For example, the history monitoring portion 52 stores the compression condition setting data D8 in the history data storage portion 6. This enables the history monitoring portion 52 to recognize the execution state of the compression condition enhancement process in the past.

On the other hand, in the proposal notification process, proposal information is notified, wherein the proposal information proposes an exchange or an additional installment of a component in the image forming apparatus 10. The history monitoring portion 52 may execute the proposal notification process when the compression history data D7 after an execution of the compression condition enhancement process satisfies the insufficient compression condition.

For example, in the proposal notification process, the history monitoring portion 52 may cause the display portion 36 to display a notification message D9 concerning an exchange or an additional installment of a component. In this case, the history monitoring portion 52 transmits data including the notification message D9 to the MMI control portion 37, and the MMI control portion 37 causes the display portion 36 to display the notification message D9. The notification message D9 is an example of the information that corresponds to a satisfaction of the insufficient compression condition.

In addition, the history monitoring portion 52 may transmit data including the notification message D9 via the communication control portion 1 to a terminal 9 of a predetermined manager. The data including the notification message D9 may be transmitted to, for example, a terminal of a company which provides the maintenance service of the image forming apparatus 10, as well as to the terminal 9 of the user.

Figure 5:
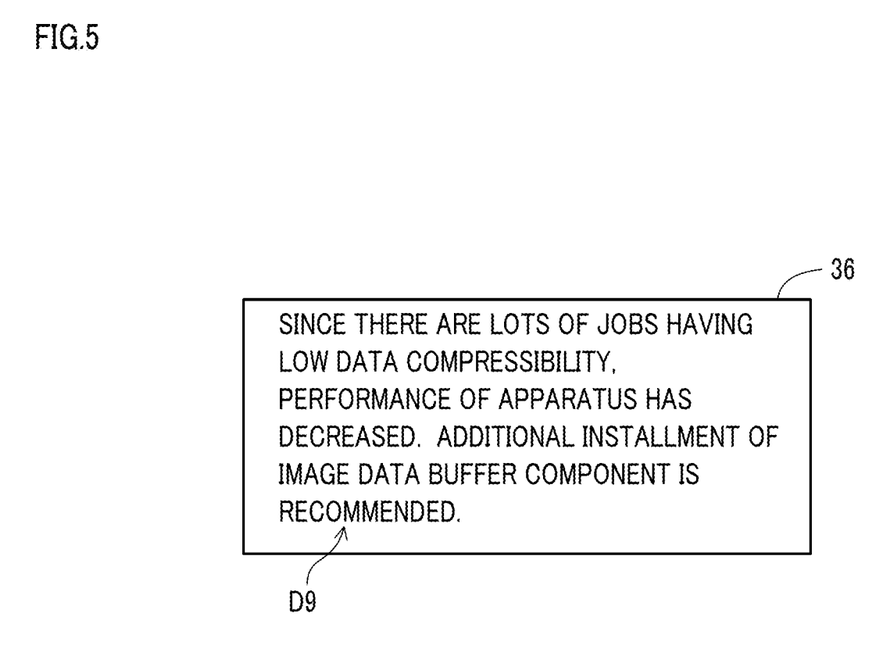
FIG. 5 shows an example of a notification screen in the image forming apparatus according to an embodiment of the present disclosure.

FIG. 5 shows an example of a notification screen of the display portion 36 on which the notification message D9 is displayed in the proposal notification process.

On the other hand, the excess compression condition is that a situation where the compression level of the compression process exceeds a predetermined allowable upper limit occurs with a frequency that exceeds a predetermined threshold. In the case where the compression history data D7 shown in FIG. 3 is adopted, the excess compression condition is that the value of the class H in the compression level frequency data D70 exceeds a predetermined upper threshold.

In the present embodiment, the second improvement process includes a compression condition mitigation process. In the compression condition mitigation process, the reference compression condition is changed in a direction where the compression level of the compression process is reduced, namely, in a direction where the compression rate is increased.

More specifically, the history monitoring portion 52 outputs the compression condition setting data D8 to the data compression portion 23 even when the compression history data D7 satisfies the excess compression condition. It is noted here that, in the compression condition setting data D8 output in the compression condition mitigation process, the compression condition specification data D80 specifies the difference between a current level and a changed level of the encode quality parameter, wherein the changed level is higher than the current level in image quality.

With respect to a piece of raster image data D30 that was converted from a piece of job data D1 that corresponds to a piece of job attribute data D2 in the compression condition setting data D8, the data compression portion 23 executes the compression process under the compression condition specified by a piece of compression condition specification data D80 that corresponds to the piece of job attribute data D2.

According to the present embodiment, in a situation where a lot of pieces of job data D1 that do not show the effect of the compression much are input to the image forming apparatus 10, the reference compression condition is automatically enhanced. This reduces the frequency of re-execution of the compression process, and allows the performance of the speed of the image forming process to be exhibited to the maximum.

In addition, in a situation where a lot of pieces of job data D1 that show the effect of the compression well are input to the image forming apparatus 10, the reference compression condition is automatically mitigated. This restricts the image quality degradation caused by the compression process, and allows the performance of the image quality in the image forming process to be exhibited to the maximum.

Furthermore, when the ability of the image forming apparatus 10 is not sufficient to deal with some kinds of job data D1 that are frequently input, the proposal notification process is executed so as to propose an exchange or an additional installment of a component. With this configuration, the user or the maintenance service provider is expected to take an appropriate measure for the improvement.

Application Examples

The compression history data D7 may separately include compression level frequency data D70 correlated with the supplier identification data D21 and compression level frequency data D70 correlated with the type identification data D22. This makes it possible for the history monitoring portion 52 to perform the determination on the insufficient compression condition and the excess compression condition for each piece of supply source identification data D21 and, independently of that, perform the determination on the insufficient compression condition and the excess compression condition for each piece of type identification data D22.

In addition, the job attribute data D2 in the compression history data D7 may be composed of only one of the supplier identification data D21 and the type identification data D22.

Furthermore, when the compression history data D7 satisfies the insufficient compression condition, the history monitoring portion 52 may execute in parallel the compression condition enhancement process and the proposal notification process. In this case, the compression condition enhancement process is executed as a temporary measure, and the proposal notification process urges the user or the like to take a permanent measure.

Furthermore, there may be a case where the change in size of the raster image data D30 of each output unit is small. In this case, in the image forming apparatus 10, instead of the compression rate, the size of the compressed data D3 may be adopted as the index that represents the compression level of the compression process.

It is noted that the image forming apparatus of the present disclosure may be configured by, within the scope of claims, freely combining the above-described embodiments and application examples, or by modifying the embodiments and application examples or omitting a part thereof.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
a data conversion portion, a data compression portion, a compression history recording portion, and a history monitoring portion, each executable by an application specific integrated circuit or a processor, wherein
the data conversion portion is configured to convert job data for image formation to raster image data;
the data compression portion is configured to execute a compression process for compressing the raster image data under a predetermined reference compression condition, and when a compression level of the compression process does not satisfy a predetermined allowable compression condition, re-execute the compression process under a modified compression condition modified from the reference compression condition;
the compression history recording portion is configured to store compression history information in a non-transitory computer-readable information storage medium, the compression history information including compression level frequency data representing results of accumulation of compression levels through the compression process executed by the data compression portion; and
the history monitoring portion is configured to execute a predetermined improvement process when the compression level frequency data satisfies a predetermined insufficient compression condition, wherein
in the compression history information, the compression level frequency data is correlated with job attribute information that identifies a supplier of the job data that corresponds to the raster image data, and
the history monitoring portion determines, for each piece of the job attribute information, whether or not the compression level frequency data satisfies the insufficient compression condition, and executes the improvement process when the compression level frequency data satisfies the insufficient compression condition.

2. The image forming apparatus according to claim 1, wherein
the job attribute information further includes information that represents a type of the job data that corresponds to the raster image data.

3. The image forming apparatus according to claim 1, wherein
the compression level frequency data represents a frequency distribution of compression levels in the compression process of each predetermined output unit under the reference compression condition, and
the insufficient compression condition is that, in the compression level frequency data, a situation where the compression level of the compression process falls below a predetermined allowable lower limit occurs with a frequency that exceeds a predetermined threshold.

4. The image forming apparatus according to claim 1, wherein
the improvement process includes a compression condition enhancement process in which the reference compression condition is changed in a direction where the compression level of the compression process is improved.

5. The image forming apparatus according to claim 4, wherein
when the compression level frequency data satisfies a predetermined excess compression condition, the history monitoring portion changes the reference compression condition in a direction where the compression level of the compression process is reduced.

6. The image forming apparatus according to claim 4, wherein
when the compression level frequency data after an execution of the compression condition enhancement process satisfies the insufficient compression condition, a process of notifying information that corresponds to a satisfaction of the insufficient compression condition is executed in the improvement process.

7. The image forming apparatus according to claim 1, wherein
the improvement process includes a process of notifying information that corresponds to a satisfaction of the insufficient compression condition.

* * * * *